US012626540B2

(12) United States Patent
Dasari et al.

(10) Patent No.: US 12,626,540 B2
(45) Date of Patent: May 12, 2026

(54) METHOD FOR DETECTING AN APPLICATION PROGRESS AND HANDLING AN APPLICATION FAILURE IN A DISTRIBUTED SYSTEM

(71) Applicants: Robert Bosch GmbH, Stuttgart (DE); Carnegie Mellon University, Pittsburgh, PA (US)

(72) Inventors: Dakshina Narahari Dasari, Renningen (DE); Arne Hamann, Ludwigsburg (DE); Nuno Pereira, Pittsburgh, PA (US)

(73) Assignee: ROBERT BOSCH GMBH, Stuttgart (DE)

(*) Notice: Subject to any disclaimer, the term of this patent is extended or adjusted under 35 U.S.C. 154(b) by 224 days.

(21) Appl. No.: 18/509,972

(22) Filed: Nov. 15, 2023

(65) Prior Publication Data

US 2024/0282151 A1 Aug. 22, 2024

(30) Foreign Application Priority Data

Feb. 17, 2023 (DE) ..................... 10 2023 201 398.3

(51) Int. Cl.
*G07C 5/00* (2006.01)
*G06F 11/14* (2026.01)
*G06F 11/20* (2006.01)

(52) U.S. Cl.
CPC .................................... *G07C 5/008* (2013.01)

(58) Field of Classification Search
CPC . G07C 5/008; G06F 11/0709; G06F 11/0739; G06F 11/079; G06F 11/3006; G06F 11/3013; G06F 11/3051; G06F 11/14; G06F 11/20
See application file for complete search history.

(56) References Cited

U.S. PATENT DOCUMENTS 6,817,010 B2 * 11/2004 Aizenbud-Reshef ........................ G06F 11/362 714/E11.181
7,062,749 B2 * 6/2006 Cyr ........................ G06Q 10/00 717/103
8,078,902 B2 * 12/2011 Jonnagadla ......... G06F 11/0757 714/38.1
10,106,169 B2 * 10/2018 Ballmann ......... B60W 50/0205
2015/0286475 A1 * 10/2015 Vangelov .................. G06F 8/65 717/170
2015/0288636 A1 * 10/2015 Yalavarty .............. H04L 51/216 709/206
2015/0331422 A1 * 11/2015 Hartung ................... G05D 1/02 701/23

(Continued)

*Primary Examiner* — Chris Parry
*Assistant Examiner* — Hassan Abdur-Rahman Khan
(74) *Attorney, Agent, or Firm* — NORTON ROSE FULBRIGHT US LLP

(57) ABSTRACT

A method for detecting an application progress and handling an application failure in a distributed system. The method includes: monitoring an interaction between modules of at least one application, the at least one application being deployed across different physical nodes, the interaction being carried out by exchanging messages between the modules using a message broker, the monitoring being carried out at least partially using the message broker; detecting the application progress based on the monitoring; initiating a failure handling based on the detecting.

20 Claims, 3 Drawing Sheets

(56) References Cited

U.S. PATENT DOCUMENTS

| | | | | |
|---|---|---|---|---|
| 2017/0262274 | A1* | 9/2017 | Vangelov | G06F 8/65 |
| 2019/0173951 | A1* | 6/2019 | Sumcad | H04L 67/55 |
| 2019/0222484 | A1* | 7/2019 | Ricci | G06F 11/2023 |
| 2020/0273268 | A1* | 8/2020 | Bhattacharyya | G06Q 10/06315 |
| 2021/0300398 | A1* | 9/2021 | Yamashiro | G01C 21/3682 |
| 2022/0321566 | A1* | 10/2022 | Coyle | H04L 63/101 |
| 2023/0036132 | A1* | 2/2023 | Abdelwahab | H04L 5/0055 |

* cited by examiner

METHOD FOR DETECTING AN APPLICATION PROGRESS AND HANDLING AN APPLICATION FAILURE IN A DISTRIBUTED SYSTEM

CROSS REFERENCE

The present application claims the benefit under 35 U.S.C. § 119 of German Patent Application No. DE 10 2023 201 398.3 filed on Feb. 17, 2023, which is expressly incorporated herein by reference in its entirety.

BACKGROUND INFORMATION

In distributed setups, where applications are deployed across different physical nodes, it is important to actively monitor the health of an application composed of a set of interacting modules or services which may be spread across the different nodes. The monitored health of application modules or services can be used to trigger recovery mechanisms, e.g., restart the module or failover to a redundant module.

Conventional mechanisms address the problem of whether a node or application is alive (e.g., by responding to heartbeats or pings from a central co-ordinator). However, conventional methods are not able to consider details of whether an application is indeed progressing. An application may be internally stalled due to live locks or deadlocks, whereas another thread in the application may be actively simply responding to the liveliness checks.

SUMMARY

According to aspects of the present invention, a method, a computer program, and a data processing apparatus are provided. Features and details of the present invention are disclosed herein. Features and details described in the context to the method according to the present invention also correspond to the computer program as well as the data processing apparatus, and vice versa in each case.

One aspect of the present invention comprises a method for detecting an application progress and/or handling an application failure in a distributed system. According to an example embodiment of the present invention, the method comprises according to a first method step monitoring an interaction between modules of at least one application. The at least one application may be deployed across different physical nodes, particularly hardware platform for data processing. The interaction may be carried out by exchanging messages between the modules, preferably using a message broker. Furthermore, the monitoring may be carried out at least partially using the message broker. According to another method step, the method may comprise detecting the application progress based on the monitoring. According to a further method step, the method may comprise initiating a failure handling based on the detecting. The method steps may be carried out one after the other and/or repeatedly. The present invention may thereby allow to detect application progress and to handle application failure in a distributed setup.

The method according to an example embodiment of the present invention may be implemented using a system setup comprising a message broker, particularly centralized enhanced message broker, also referred to as EMB, particularly with an application progress detector, also referred to as APD, and/or a centralized orchestrator and/or a local module manager, the latter particularly on each physical node in the distributed setup. The EMB with an additional APD may be cognizant of the application graph and the interaction between the constituent modules. It may be configured to detect when an application module is not progressing and accordingly deals with unprocessed messages and hands it over to the application module when it is restarted. The EMB may interact with a central orchestrator which may have a global view of the deployment of applications across different nodes, particularly hardware platforms. On each of the nodes, a local module manager (also referred to as LMM) may be used to execute commands sent by the orchestrator. It may also send information regarding the status of the modules and the node resource availability information (periodically and on specific events) to the orchestrator.

According to an example embodiment of the present invention, each application may specify its static architecture (particularly the constituent modules and their interactions) to the APD and additionally specify, for each module, the messages it will publish and subscribe to in a corresponding application manifest. The application, in addition, optionally specifies in the manifest, how its constituent modules interact with each other (via messages) in a normal mode, which may then be used by the EMB to detect deviant behaviour. The manifest may also be augmented with information regarding how the broker must handle messages, e.g., by buffering or evicting them, when it detects that a module is down. The APD may monitor the interactions between different modules by monitoring the time when messages are received by a module and whether it responds correspondingly within a given time, as specified in the application manifest, or learns the trend of interactions and issues a warning when it detects a deviation from the regular behaviour. If the application does not specify specific timing details regarding the receipt and/or publishing of messages, the APD may infer a pattern and send out a warning when it observes a deviation in behaviour.

According to an example embodiment of the present invention, based on the information gathered, the APD may trigger a recovery mechanism for a failed module or also influence a more optimal deployment of the modules. Since the EMB may record the transactions for each application, it can also infer the sequence of interactions leading to a failure or blocking in a module. The proposed solution may have the advantage of avoiding the need for actively probing the application in this mechanism, since the APD infers the liveness and/or progress across different modules based on observing the messages published by different modules.

According to an example embodiment of the present invention, the application may be deployed across different nodes and therefore referred to as distributed applications. The message broker may be able to detect an application progress and to recover the distributed applications using the failure handling. The failure handling therefore may include a recovery mechanism, e.g., restarting at least a part of the application, particularly a module or service of the application, and/or a failover to a redundant module.

According to an example embodiment of the present invention, the node, also referred to as physical node, may be a hardware platform used to execute the applications, wherein the application may comprise a set of interacting modules and/or services that are spread across the different nodes of a distributed system. A distributed system may be understood as a system whose components are located on different networked computers, which communicate and coordinate their actions by passing messages to one another from any system.

Optionally, according to an example embodiment of the present invention, the monitoring is carried out at least partially by the message broker, particularly by using a publish-subscribe-mechanism. The message exchange may be carried out to provide at least one functionality of the at least one application, particularly a driving functionality for a vehicle. The vehicle may be a motor vehicle and/or a passenger vehicle and/or an autonomous vehicle configured for autonomous driving. The message broker, particularly referred to as EMB, may be an intermediary computer program module that translates a message from the formal messaging protocol of the sender to the formal messaging protocol of the receiver. Furthermore, the message broker may provide different message delivery patterns, particularly a publication-subscriber-mechanism, and/or provide message validation and/or message transformation and/or message routing and/or message delivery guarantees and/or may simplify communication. The message broker may be part of a message-oriented middleware.

According to an example embodiment of the present invention, it is possible that each of the at least one application, particularly each of multiple applications, registers with the message broker and specifies the messages to be exchanged, particularly published or subscribed to. The monitoring may be carried out based on observing the specified messages. The usage of a publisher-subscriber-mechanism has the advantage of an efficient message exchange and monitoring of the messages to determine the application progress.

According to an example embodiment of the present invention, it is also possible that an application manifest is provided by each of the at least one (or multiple) applications. The monitoring may be carried out based on the application manifest, particularly by evaluating the application manifest. The application manifest may be specific for and preferably defines at least one of the following specifications of the respective application:

- a topology,
- the interactions among the modules,
- the requirements,
- a list of the modules,
- a list of messages published and/or subscribed by each of the modules,
- information about the timing behaviour for the interactions, particularly the time between receiving input and publishing output messages and/or a maximum backlog of input messages before which an output is expected and/or a minimum number of messages that must be processed successfully,
- a recovery mechanism to be carried out as part of the failure handling.

According to an example embodiment of the present invention, it is also possible that the failure handling comprises sending a result of the detecting to a central orchestrator of the distributed system to initiate further actions. The central orchestrator may be used at least for spawning and/or terminating and/or suspending and/or migrating the modules, particularly by providing commands from the orchestrator to a local module manager.

According to an example embodiment of the present invention, a local module manager may be provided for deploying and/or stopping and/or starting at least one of the modules on at least one of the different physical nodes, particularly based on the commands from the orchestrator. Additionally, or alternatively, the local module manager may be provided for sending information about a status of the modules and resources of the nodes to the orchestrator. The orchestrator may provide the commands based on this information. The local module manager may be provided on each of the nodes.

Furthermore, according to an example embodiment of the present invention, the detecting the application progress may comprise at least one of the following steps:

- determining a sequence of messages that are erroneously not processed by at least one of the modules,
- detecting a failure of at least one of the modules based on the monitoring, particularly based on the determining of the sequence of unprocessed messages,
- backtracking through the sequence of unprocessed messages for a diagnosis of the source of the failure.

This allows to efficiently determine the application progress, which allows to detect a failure of the application.

According to an example embodiment of the present invention, it is possible that the monitoring comprises at least one of the following steps:

- determining a duration between receiving an input message and publishing an output message, and particularly detecting the application failure in case the determined duration exceeds a predefined maximum, preferably according to a definition by an application manifest,
- determining a number (i.e., the amount) of unprocessed messages and detecting the application failure in case the determined number exceeds a predefined maximum, particularly according to a definition by an application manifest,
- determining a number (i.e., the amount) of processed messages and detecting the application failure in case the determined number falls below a predefined minimum, particularly according to a definition by an application manifest.

This allows to detect the failure of the application based on the monitoring.

Additionally, according to an example embodiment of the present invention, it is possible that a learning phase is provided. The monitoring may comprise a recording of the interaction during the learning phase and may thereby specify a timeout value. Furthermore, the application failure may be detected after the learning phase based on the recorded interaction, particularly by comparing a duration between receiving an input message and publishing an output message with the specified timeout.

In another aspect of the present invention, a computer program may be provided, in particular a computer program product, comprising instructions which, when the computer program is executed by a computer, cause the computer to carry out the method according to the present invention. Thus, the computer program according to the present invention can have the same advantages as have been described in detail with reference to a method according to the present invention.

In another aspect of the present invention, an apparatus for data processing, also referred to as data processing apparatus, may be provided, which is configured to execute the method according to the present invention. As the apparatus, for example, a computer can be provided which executes the computer program according to the present invention. The computer may include at least one processor that can be used to execute the computer program. Also, a non-volatile data memory may be provided in which the computer program may be stored and from which the computer program may be read by the processor for being carried out.

According to another aspect of the present invention a computer-readable storage medium may be provided which comprises the computer program according to the present invention. The storage medium may be formed as a data storage device such as a hard disk and/or a non-volatile memory and/or a memory card and/or a solid-state drive. The storage medium may, for example, be integrated into the computer.

Furthermore, the method according to the present invention may be implemented as a computer-implemented method.

Further advantages, features and details of the present invention will be apparent from the following description, in which embodiments of the present invention are described in detail with reference to the figures. In this connection, the features mentioned herein may each be essential to the present invention individually or in any combination.

DETAILED DESCRIPTION OF EXAMPLE EMBODIMENTS

In the following figures, the identical reference signs are used for the same technical features even of different embodiment examples.

Figure 2:
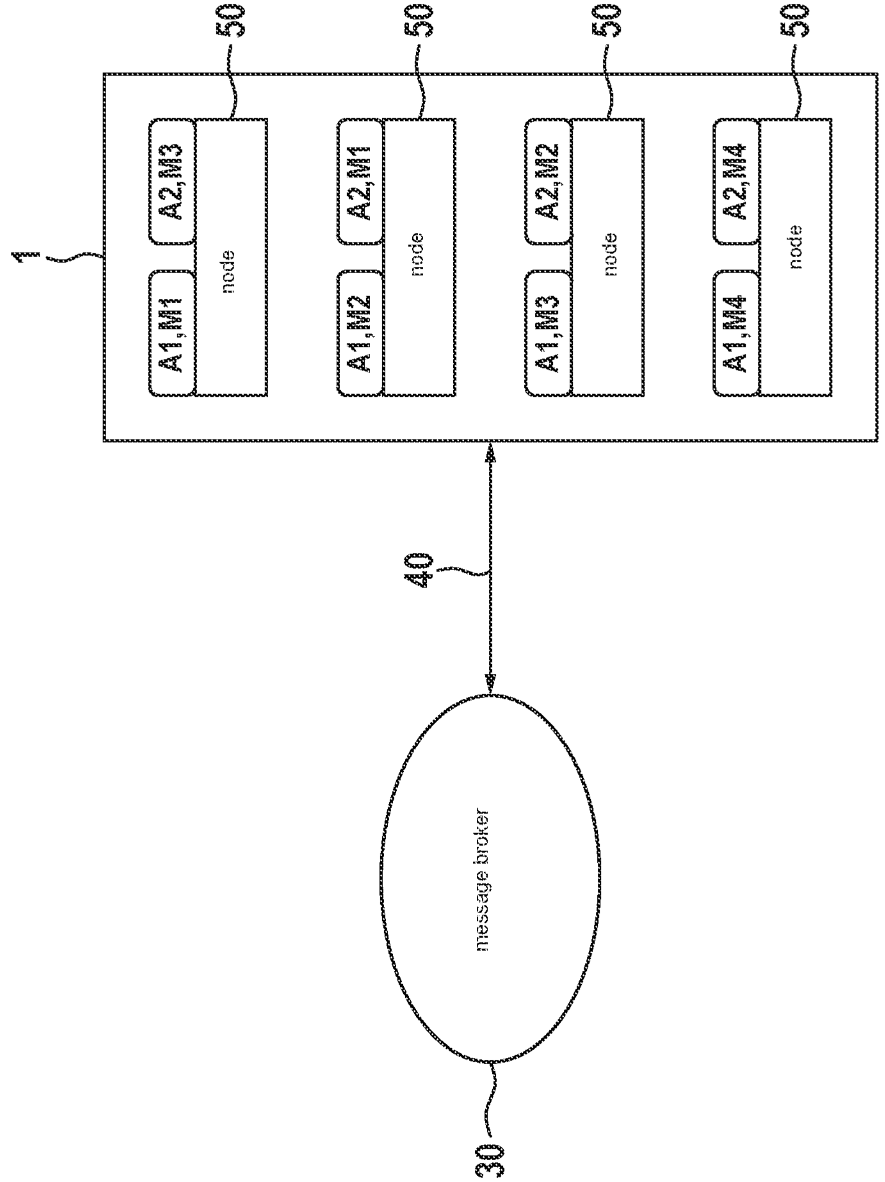
FIG. 2 shows a schematically visualization of embodiments of the present invention.

Many modern distributed systems rely on a message broker to support different message delivery patterns, provide message delivery guarantees and in general simplify communication. A common pattern supported is the Publication-Subscriber-Mechanism, or short Pub-Sub, as shown in FIG. 2, that allows disseminating information between data producers (publishers) and data consumers (subscribers), where publishers forward their data through the message broker 30. Pub-Sub is a central piece of many IoT and cloud infrastructures, and it can be found in many popular distributed systems 1 today. A specific problem may be to identify modules or services communicating over a Pub-Sub that are not progressing. In such a distributed setup, an application module may be receiving certain messages, but not reacting on them. The problem is then how to identify a blocked module, in such a case, without deeper insights into the application logic (the application may be regarded as a black box). The task gets more challenging in a distributed setup, composed of applications with complex interactions 40 among different modules. In short, conventional mechanisms usually only deal with the problem of detecting whether a node 50 or application is alive without monitoring application progress. Liveness detection is carried out by some protocols at the message level to meet certain QoS requirements, but it does not address the bigger problem of analysing whether a module is down. Furthermore, conventional liveliness detectors apply application-agnostic liveliness checks, and do not detect deviation in application behaviour with respect to its interactions 40 with others. In addition, in distributed setups, large applications have no conventional mechanisms to trace back application inactivity to specific modules, and then trigger application specific mechanisms from the perspective of the message broker 30.

Figure 1:
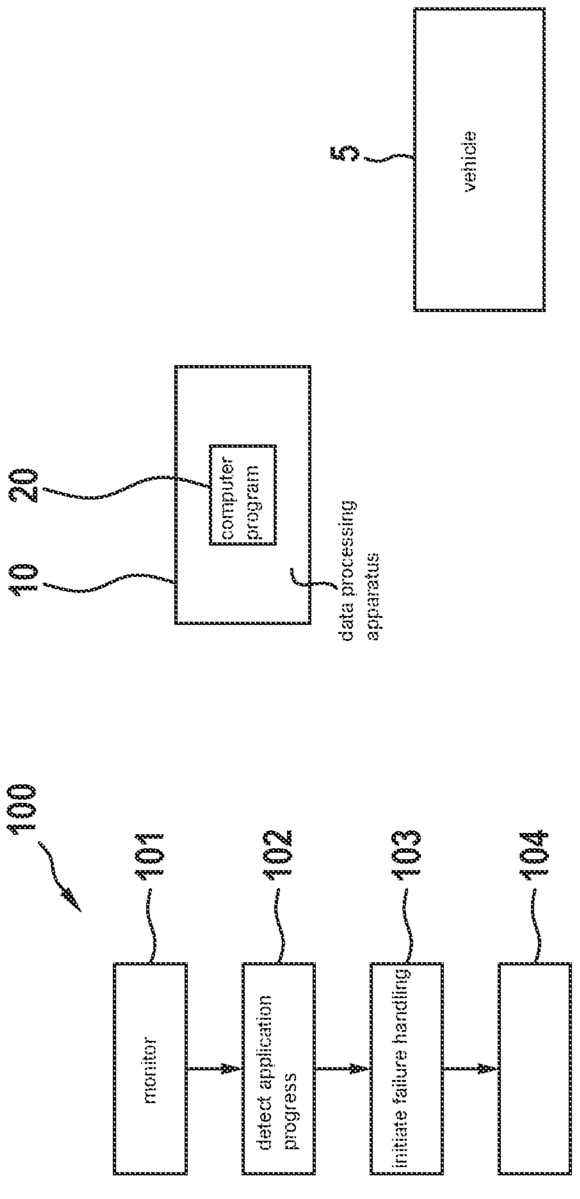
FIG. 1 shows a method, computer program and apparatus according to embodiments of the present invention.

FIG. 1 shows a method 100 according to embodiments of the present invention for detecting an application progress and handling an application failure in a distributed system 1. Also, a computer program 20 and a data processing apparatus 10 according to embodiments of the present invention is shown.

Figure 3:
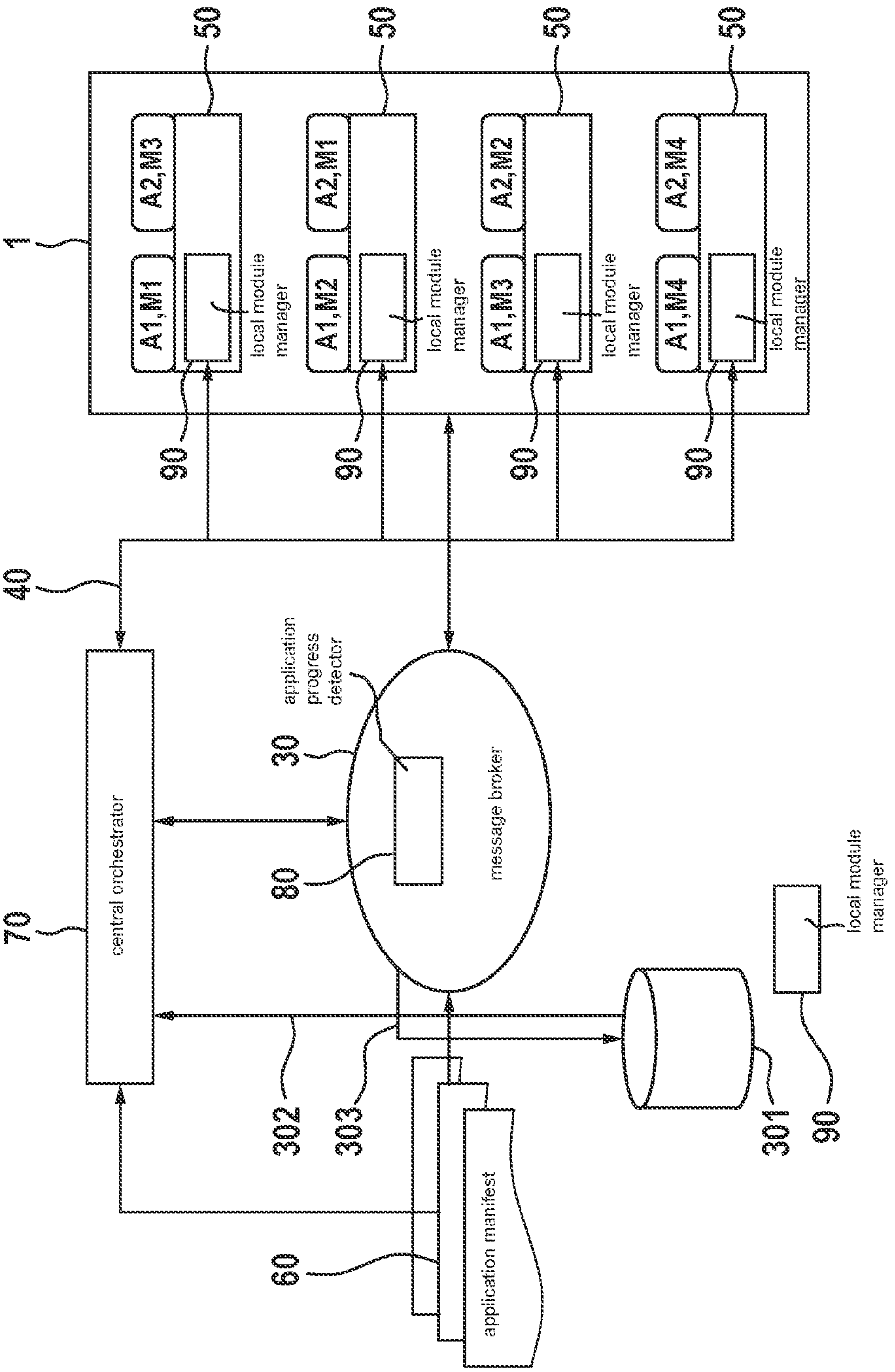
FIG. 3 shows another schematically visualization of embodiments of the present invention.

According to a first method step 101, a monitoring may be carried out. This may include monitoring an interaction 40 between modules M1, M2, M3, M4 of at least one application A1, A2, as shown in FIGS. 2 and 3. The at least one application A1, A2 may be deployed across different physical nodes 50. Furthermore, the interaction 40 may be carried out by exchanging messages between the modules M1, M2, M3, M4 using a message broker 30. The message exchange may be carried out to provide at least one functionality of the at least one application A1, A2, particularly a driving functionality for a vehicle 5. The monitoring may be carried out at least partially using the message broker 30. According to a second method step 102, the application progress may be detected based on the monitoring. According to a third method step 103, a failure handling may be initiated based on the detecting.

Furthermore, an application manifest 60 may be provided by each of the at least one applications A1, A2 and the monitoring 101 may be carried out based on the application manifest 60.

The failure handling may comprise sending a result of the detecting 102 to a central orchestrator 70 of the distributed system 1 to initiate further actions. The central orchestrator 70 may provide commands to a local module manager 90.

Embodiments of the present invention may allow the detection of an application progress, particularly an inactivity, in distributed applications and preferably handling messages by the message broker according to the application semantics to deal with application recovery. Specifically, the node 50 may be up, but the hosted application may not be actively progressing due to various reasons, as, e.g., livelocks, deadlocks, or simply since it was not designed to handle certain inputs, causing it to block. In a distributed setup, such a module may be receiving inputs, but not reacting on them and not processing them to publish inputs.

As exemplarily shown in FIG. 3, the message broker 30, particularly referred to as enhanced message broker 30 or EMB 30, according to embodiments of the present invention, may be configured to establish and implement the publish and subscribe mechanism between different applications. Furthermore, application modules may register with the EMB 30 and specify which messages they publish or subscribe to. The EMB 30 may therefore be cognizant of which modules are actively publishing or subscribing to a specific message. Furthermore, the EMB 30 may additionally have an application progress detector 80 (also referred to as APD 80) which also reads the application manifest 60 and monitors the interactions 40 of each module. It may detect when a module is inactive, i.e., particularly not progressing due to say deadlocks, and may send this information to the central orchestrator 70 to trigger further actions (see 302). It may also log information regarding the messages published and subscribed by each of the modules (see 303, wherein 301 refers to a database 301 used for storing the logged information). The APD 80 may be realized as a submodule of the EMB 30 and may work in tandem with a central orchestrator 70 in a distributed system 1. Furthermore, the EMB 30 may read the application manifest 60 to also decide on the buffering policy (retention policy) of messages for modules that fail. Another use for the EMB 30 may be failure analysis, since the EMB 30 has a knowledge of the interactions 40 among the different modules and a trace of which messages were not processed by a module. When it detects that a module is down, it may backtrack through the sequence of messages leading to the failure. This is especially useful in large applications with complex interactions 40 across different modules. In many cases, an unhandled input sequence (or out of range input) may lead to unexpected behaviour and application stalls. The EMB 30 can then re-engineer the sequence of messages across modules, which lead to the failure and then send it out to the local module manager 90 to forward it to the failed application failure logs to help deeper diagnosis.

The central orchestrator 70 may be configured to control the application lifecycle, e.g., spawning, terminating, suspending, migrating application modules, mapping them to the right nodes 50 to meet their Qos (Quality of Service) requirements and to balance system 1 loads and the like.

The local module manager 90 (LMM 90), as exemplarily shown in FIG. 3, may reside on each node 50 and executes commands by the orchestrator 70 to deploy and/or stop and/or start a module on a given node 50. It may also send information regarding the status of the modules and the node resource availability information (periodically and on specific events) to the orchestrator 70, thereby enabling the orchestrator 70 to make informed decisions.

As shown in FIG. 3, the application manifest 60 may describe the topology of the application, the interactions 40 among the modules and its requirements. The application manifest 60 may comprise a list of the modules and/or an indication of Qos requirements of the application like end-to-end requirements of the application and/or, for each module, at least one of the following:

- a list of messages published by the module, wherein each message may be identified by a message name and every instance of the message by a message instance number,
- a list of the messages subscribed by the module,
- a correlation between the input and output messages (e.g., the module reads input messages T1 and T2 to publish to message T3),
- a normal module interaction information, wherein the module may in addition give hints regarding the expected or normal timing behaviour (for each set of inputs and outputs), wherein this may be used by the APD 80 to detect deviations or outliers and raise alarms, and this could include either of the following information:
  - an absolute time, particularly the maximum time between receiving inputs and publishing output messages. If the inputs arrive at different times, it may be provided to specify the processing semantics. For example, if module M1 reads T1 and T2, the latest time of the two inputs may be used and from there the time to produce the input may be computed, or, for example, module M1 may read the latest values of T1 and T2 periodically, and then produces T3,
  - a backlog or maximum backlog of inputs before which an output is expected,
  - a m-out-of-k: Some modules may be more resilient to intermittent failures (in the network, etc.). For such modules, a "m out of k" approach is useful. This means the module specifies that out of every "k" set of inputs, at least "m" must be processed successfully,
  - no specific information,
- expected timing activation patterns of the inputs, for example:
  - periodic, with a specified period,
  - sporadic, with a minimum inter-arrival time,
  - or with arrival curves,
- a recovery mechanism, particularly the recovery action that must be taken when the module is down, for example:
  - restart the module on the same node 50,
  - kill the module,
  - kill the module and relaunch it on another node 50,
- a message retention policy, particularly the attributes how the input topics must be handled by the message broker if the receiving module is down, for example:
  - Buffer last "k" messages and forward the last "k" messages to the application module is respawned, or
  - Do not buffer any messages
- attributes of the hardware required by the module.

Exemplarily algorithms according to the four cases are described below. Depending on the specifications of the expected behaviour (see above) by the application, the APD 80 may take different actions. According to a first case of "absolute time":

1. The module receives message to which it has subscribed (Input),
2. The module sends an acknowledgement to the APD 80 on the receipt of the input message (s), together with timestamp,
3. The APD 80 on the message broker 30 records the time of an application receiving the input message (s),
4. The APD 80 sets a timeout counter, corresponding to the max time since the application must publish an output message,
5. If the application behaves normally and publishes the output message before the timeout, the APD 80 records the time of receiving the output and the broker forwards the output to the interested subscribers of the output message,
6. If the application does not publish, e.g., output message X before the timeout:
   a. The timeout interrupt goes off,
   b. The APD 80 informs the subscribers of the message X that the publisher is down,
   c. If connected to a central orchestrator 70, it informs the orchestrator 70 that the application is down,
   d. The orchestrator 70 accordingly triggers the recovery mechanism as per as the module specification to the local module manager 90,
   e. The orchestrator 70 triggers the deadlock detector/diagnosis module to understand the cause for the deadlock.

According to a second case of "Backlog", the module may specify a maximum backlog of unprocessed messages:

1. The APD 80 keeps an account of the unprocessed number of input messages (backlog) by the module,
2. When the backlog exceeds the threshold, it sets up an alarm and does the following:
   a. The APD 80 informs the subscribers of the message X that the publisher is down,
   b. If connected to a central orchestrator 70, it informs the orchestrator 70 that the application is down,
   c. The orchestrator 70 accordingly triggers the recovery mechanism as per as the module specification to the local module manager 90,
   d. The orchestrator 70 triggers the deadlock detector/diagnosis module to understand the cause for the deadlock.

According to a third case of "m-of-k", the module may specify a constraint in which m of every k input must be processed:

1. The APD 80 keeps a history of the last "k" inputs received by the module and how many of these were processed, for example, using a sliding window or a circular log history of size k,
2. When the number of processed messages is less than "m" in the window of the last k messages, then
   a. The APD 80 informs the subscribers of the message X that the publisher is down,
   b. If connected to a central orchestrator 70, it informs the orchestrator 70 that the application is down,
   c. The orchestrator 70 accordingly triggers the recovery mechanism as per as the module specification to the local module manager 90,
   d. The orchestrator 70 triggers the deadlock detector/diagnosis module to understand the cause for the deadlock.

According to a fourth case of having no specific information:

1. The APD 80 records the time of an application receiving the input messages and over time, derives (learns) a trend of subscribe/publish behaviour using heuristics or ML techniques,
2. The APD 80 auto-learns this "safe range of time" beyond which it characterizes it as an erroneous situation, and sets a timeout value, relative to the last input received,
3. If the application behaves normally and publishes the output message before the timeout, the APD 80 records the time of receiving the output and the broker forwards the output to the interested subscribers of the output message,
4. If the application does not publish output message X before the timeout:
   a. The timeout interrupt goes off,
   b. The APD 80 informs the subscribers of the message X that the publisher is down,
   c. If connected to a central orchestrator 70, it informs the orchestrator 70 that the application is down,
   d. The orchestrator 70 accordingly triggers the recovery mechanism as per as the module specification to the local module manager 90,
   e. The orchestrator 70 triggers the deadlock detector/diagnosis module to understand the cause for the deadlock.

When the application module is relaunched, depending on the specifications in the application manifest 60, either all unprocessed messages may be forwarded to the relaunched module, or the last "k" unprocessed messages may be forwarded to the relaunched module.

The message broker 30 and the orchestrator 70 may be configured as different components or may be also integrated in one component, so that orchestration 70 and message brokering 30 are carried out as two different sub-components in a single application. The enhanced message broker 30 may also delegate the application progress detection 80 responsibilities to the local module manager 90, so that it functions not as one central component, but rather as a distributed component.

The above explanation of the embodiments describes the present invention in the context of examples. Of course, individual features of the embodiments can be freely combined with each other, provided that this is technically reasonable, without leaving the scope of the present invention.

What is claimed is:

1. A method for detecting an application progress and handling an application failure in a distributed system, the distributed system including a message broker through which messages are transmitted between a plurality of modules of at least one application deployed across different physical nodes, the message broker being programmed with a respective application manifest for each of one or more of the modules, the manifest specifying expected processing behavior of the respective module within a processing pipeline, including that when the message broker routes to the respective module a predefined input message output by another of the modules in the processing pipeline, the respective module is expected to generate a corresponding predefined output message for routing by the message broker to the other of the modules or to a further one of the modules in the processing pipeline, the method comprising the following steps:

monitoring, by the message broker, for consistency of interactions between the modules with the application manifests;

detecting, by the message broker, that a respective one of the modules has stalled when a result of the monitoring is that an expected processing behavior defined in the respective manifest is not met, wherein the expected processing behavior comprises any one or more of the following: an expected timing between receiving the input message and publishing the output message, a maximum backlog of unprocessed input messages, and a minimum number of messages to be processed successfully; and in response to detecting that the respective module has stalled, initiating, by the message broker, a recovery action comprising:

restarting the respective module on a same physical node on which the respective module was running prior to the detection;

restarting the respective module on a different node than on which the respective module was running prior to the detection; or starting a backup module to perform a processing of the stalled module.

2. The method of claim 1, wherein the monitoring is carried out using a publish-subscribe-mechanism, the message exchange being carried out to provide at least one functionality of the application including a driving functionality for a vehicle.

3. The method of claim 1, wherein the at least one application includes multiple applications, and wherein each of the multiple applications registers with the message broker and specifies messages to be exchanged, the monitoring being carried out based on observing the specified messages.

4. The method of claim 3, wherein the messages to be exchanged include messages that are subscribed to.

5. The method of claim 1, wherein the application manifest is specific for at least one of the following specifications of the respective application:

a topology, interactions among the modules, requirements, a list of the modules, a list of messages published and/or subscribed by each of the modules, information about a timing behaviour for the interactions including a time between receiving input and publishing output messages and/or a maximum backlog of input messages before which an output is expected and/or a minimum amount of messages that must be processed successfully, the recovery action to be carried in response to the detection of the stall.

6. The method of claim 1, wherein the recovery action includes sending a result of the detection of the stall to a central orchestrator of the distributed system to initiate further actions, the central orchestrator being used at least for spawning and/or terminating and/or suspending and/or migrating the modules by providing commands from the orchestrator to a local module manager, the local module manager being provided for deploying and/or stopping and/or starting at least one of the modules on at least one of the different physical nodes based on the commands and/or for sending information about a status of the modules and resources of the nodes to the orchestrator, the orchestrator providing the commands based on the information.

7. The method of claim 1, wherein the detecting by the message broker includes determining a sequence of messages that are erroneously not processed by at least one of the modules, detecting a failure of at least one of the modules based on the monitoring and the determining of the sequence of unprocessed messages, and/or backtracking through a sequence of unprocessed messages for a diagnosis of a source of the failure.

8. The method of claim 1, wherein the monitoring includes determining a duration between receiving an input message and publishing an output message, and detecting the stall when the determined duration exceeds a predefined maximum according to the definition in the application manifest.

9. The method of claim 1, further comprising performing, by the message broker, a learning phase in which the message broker:

records, during normal operation of the distributed system, historic timing with which the respective modules in the processing pipeline generate output messages in response to input messages output by other modules in the pipeline;

establishes, as at least part of the respective manifests of the modules and based on the recorded historic timing, at least one baseline timeout value or backlog threshold representing the expected processing behavior of the respective modules in the processing pipeline, wherein the detection of the stall occurs when an actual timing of output messages generated by a module in response to input messages from another module deviates from the baseline timeout value or backlog threshold.

10. The method of claim 1, wherein the monitoring includes determining a number of unprocessed messages and detecting the stall where the determined number exceeds a predefined maximum according to the definition in the application manifest.

11. The method of claim 1, wherein the monitoring includes determining a number of processed messages and detecting the stall when the determined number falls below a predefined minimum according to the definition in the application manifest.

12. The method of claim 1, wherein the recovery action further comprises replaying, to the restarted module or to the backup module, at least some of the input messages that were routed by the message broker to the stalled module prior to the detection of the stall, so that the restarted module or the backup module resumes processing based on the prior messages leading up to the stall.

13. The method of claim 1, wherein the recovery action includes the restarting of the respective module on the same physical node on which the respective module was running prior to the detection.

14. The method of claim 1, wherein the recovery action includes the restarting of the respective module on the different node than on which the respective module was running prior to the detection.

15. The method of claim 1, wherein the recovery action includes the starting of the backup module to perform the processing of the stalled module.

16. The method of claim 1, wherein:

the processing pipeline includes the modules performing different actions, including at least one of the modules sensing an environment and generating sensor data, and at least one other module processing the sensor data to produce an output that directly or indirectly provides the predefined input message to the respective module; and the application manifest of the respective module defines the corresponding predefined output message that the respective module is expected to generate in response to the predefined input message resulting from the sensor data within the expected timing specified in the respective manifest.

17. The method of claim 1, wherein the expected processing behavior comprises the expected timing between receiving the input message and publishing the output message.

18. The method of claim 1, wherein the expected processing behavior comprises the maximum backlog of unprocessed input messages.

19. A non-transitory computer-readable medium on which is stored a computer program including instructions for detecting an application progress and handling an application failure in a distributed system, the distributed system including a message broker through which messages are transmitted between a plurality of modules of at least one application deployed across different physical nodes, the message broker being programmed with a respective application manifest for each of one or more of the modules, the manifest specifying expected processing behavior of the respective module within a processing pipeline, including that when the message broker routes to the respective module a predefined input message output by another of the modules in the processing pipeline, the respective module is expected to generate a corresponding predefined output message for routing by the message broker to the other of the modules or to a further one of the modules in the processing pipeline, the instructions being executable by a computer of the message broker and, when executed by the computer, causing the computer to perform the following steps:

monitoring for consistency of interactions between the modules with the application manifests;

detecting that a respective one of the modules has stalled when a result of the monitoring is that an expected processing behavior defined in the respective manifest is not met, wherein the expected processing behavior comprises any one or more of the following: an expected timing between receiving the input message and publishing the output message, a maximum backlog of unprocessed input messages, and a minimum number of messages to be processed successfully; and in response to detecting that the respective module has stalled, initiating a recovery action comprising:

restarting the respective module on a same physical node on which the respective module was running prior to the detection;

restarting the respective module on a different node than on which the respective module was running prior to the detection; or starting a backup module to perform a processing of the stalled module.

20. A data processing apparatus configured to detect an application progress and handling an application failure in a distributed system, the distributed system including a message broker through which messages are transmitted between a plurality of modules of at least one application deployed across different physical nodes, the message broker being programmed with a respective application manifest for each of one or more of the modules, the manifest specifying expected processing behavior of the respective module within a processing pipeline, including that when the message broker routes to the respective module a predefined input message output by another of the modules in the processing pipeline, the respective module is expected to generate a corresponding predefined output message for routing by the message broker to the other of the modules or to a further one of the modules in the processing pipeline, the data processing apparatus comprising a computer of the message broker, the computer being configured to:

monitor, by the message broker, for consistency of interactions between the modules with the application manifests;

detect, by the message broker, that a respective one of the modules has stalled when a result of the monitoring is that an expected processing behavior defined in the respective manifest is not met, wherein the expected processing behavior comprises any one or more of the following: an expected timing between receiving the input message and publishing the output message, a maximum backlog of unprocessed input messages, and a minimum number of messages to be processed successfully; and in response to detecting that the respective module has stalled, initiate, by the message broker, a recovery action comprising:

restarting the respective module on a same physical node on which the respective module was running prior to the detection;

restarting the respective module on a different node than on which the respective module was running prior to the detection; or starting a backup module to perform a processing of the stalled module.

* * * * *